United States Patent Office 2,751,387
Patented June 19, 1956

2,751,387

DI-QUINOLYL ALIPHATIC ALKYLENE POLY-AMINO POLY ACIDS AND SALTS THEREOF

Frederick C. Bersworth, Verona, N. J., assignor to The Dow Chemical Company, Midland, Mich., a corporation of Delaware No Drawing. Application July 13, 1953,
Serial No. 367,723

8 Claims. (Cl. 260—287)

This invention relates to chelating agents for metal ions in aqueous solution and has for its object the provision of aliphatic alkylene polyamine poly acid compounds which form water soluble alkali metal salts, ammonium salts and amine salts and chelate compounds.

Another object is to provide quinolyl aliphatic alkylene polyamine poly acid compounds which form water-soluble salts and chelate compounds with metal ions in aqueous solutions.

A further object is to provide di-quinolyl alkylene polyamine poly acetic acid compounds.

Other objects will be apparent as the invention is more fully hereinafter disclosed.

In accordance with these objects I have discovered that when two (2) of the amino hydrogens of an aliphatic alkylene polyamine are displaced by quinolyl groups and the remaining amino hydrogens by acetic acid groups, propionic acid groups, and others of the same series, the resulting poly acid is an effective chelating agent in aqueous solution and forms highly soluble alkali metal salts, ammonium salts and amine salts, and metal chelate compounds with metal ions in said solution, which chelate compounds are exceedingly stable and resistant to decomposition by usual metal ion precipitating agents.

The quinolyl alkylene polyamino poly acid compounds of the present invention may be represented by the general formula:

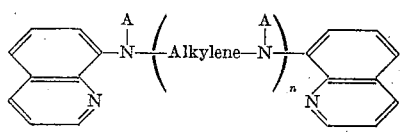

where Alkylene is a lower bivalent alkyl group which adds 2 to 3 carbon atoms to the chain and may be ethylene, propylene, trimethylene, cyclohexylene; and A is hydrogen, lower alkyl, acetic acid or propionic acid residue, the alkali metal salt of the acid, ammonium salt of the acid or amine salt of the acid, $n$ is a positive integer at least 1 which may be as high as 4 or more, wherein more than 2 amino nitrogens may be in the chain, spaced apart by alkylene groups adding 2 to 3 carbon atoms to the chain, as in diethylenetriamine, triethylenetetramine, dipropylenetriamine, tripropylenetetramine and the like aliphatic polyamines.

These substances are extremely powerful chelating agents for the heavy metals, particularly the transition metals. The chelates formed involve the reaction of one mole of chelating agent with one mole of metal ion. For example, Cu is very strongly complexed by bis (8-quinoyl) ethylene diamine (A=H and alkylene=ethylene) according to the reaction:

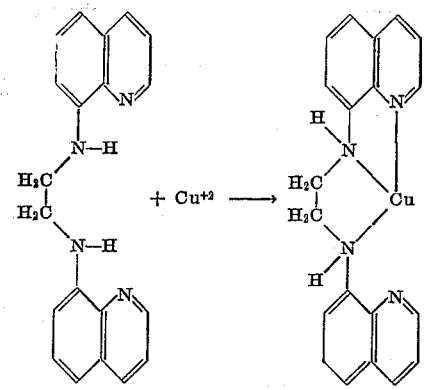

All the chelates formed with the reagents corresponding to the general formula given above are at least sparingly soluble in water and generally soluble in organic solvents, the least soluble in water being the chelates of $Fe^{II}$, $Co^{II}$ and $Ni^{II}$. However, when A=acetic acid and alkylene=ethylene, the solubility of all salts is markedly increased and the chelate compounds have greater water solubility. Such chelate compounds conform to the following general structure in organic solvents:

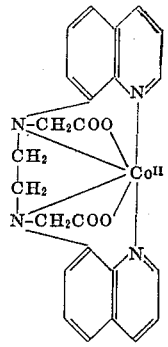

These are also quite soluble in organic solvents, particularly polar organic solvents. The most water-soluble are the copper salts of the ethylene diamine diacetic and dipropionic acid derivatives:

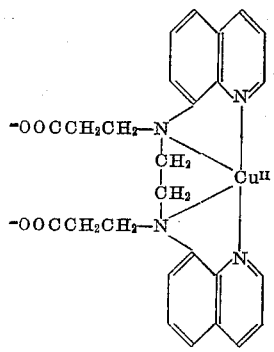

The preparation of compounds conforming to the formula stated is best referred to the few specific examples given below which are selected to illustrate the principles involved in varying the structural entities incorporated in the compound.

*Example I*

Two moles of 8-amino quinoline are heated under reflux in 50% dioxane and vigorously stirred while one mole of ethylene dichloride is slowly added over a period of 5 hours. Evaporation of the solvent results in the isolation of a crystalline product which is primarily diquinoyl ethylene diamine dihydrochloride

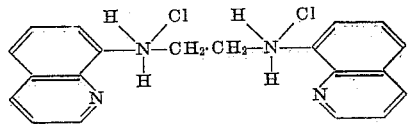

By fractional crystallization of this material from water a small amount of the disubstituted piperazine may be isolated. This does not interfere with the chelating action of the main product. In fact, the piperazine derivative is itself a good chelating agent, though not nearly as powerful as the ethylene diamine derivative. For most purposes I prefer to use the crude reaction product.

*Example II*

One mole of 8-bromo quinoline is refluxed for 6 hours with a 25% aqueous solution of N,N'-dimethylethylenediamine. On cooling the dihydrobromide of N,N'-diquinoyl, N,N'-dimethyl ethylene diamine may be obtained as a crystalline product:

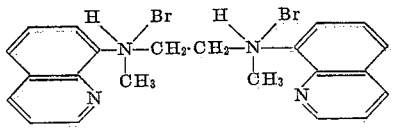

The yield and purity of this product is much more satisfactory than that obtained in the case of Example I. The main difficulty with this method lies in the fact that the dialkyl derivatives cannot be used for further synthesis. However, when ethylene diamine is used, the products have two free hydrogens which may be further substituted as in Example III.

*Example III*

An aqueous solution of two moles of 8-bromo quinoline is treated with one mole of 70 per cent ethylene diamine at the reflux temperature. The diamine is added over a period of two hours and the solution refluxed for an additional four hours. The product, primarily N,N'-diquinoyl ethylene-diamine, is not isolated but is alkalized to pH 10 with caustic soda and treated directly with two moles of NaCN and two moles of CH2O (according to the process described in my Patent No. 2,407,645). The reaction product which is the sodium salt of the quinoyl polyamino poly acetic acid, on acidification with HCl, yields a crystalline poly acid hydrochloride which is believed to have the formula:

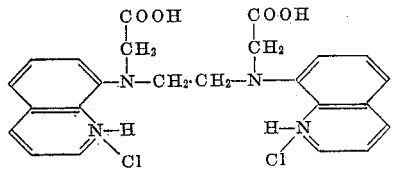

In the isolation of the compound, advantage is taken of the fact that the symmetry of the acid form of the compound renders it very sparingly soluble in water. Accordingly, though the compound is formed as its sodium salt in a strongly alkaline medium, it is recovered in the acid form by acidifying the reaction medium with hydrochloric acid, thereby precipitating the acid form of of the compound. In this manner a substantially pure compound is recovered. For actual use the compound is readily converted to its alkali metal salt by dissolving it in an aqueous solution containing an appropriate molar amount of the corresponding alkali metal hydroxide or carbonate, ammonium hydroxide or amine to form the desired salt. In this manner the sodium, potassium, lithium, cesium, rubidium, ammonium and amine salts are readily formed.

In the preceding examples the synethsis is illustrated with amines having the central ethylene, —CH2—CH2—, nucleus. It is to be understood in these examples and the following that the manipulations and reactions of the syntheses are equally applicable to amines having substituted ethylene nuclei, e. g.,

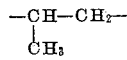

*Examples IV*

Two moles of 8-bromo quinoline is reacted with one mole of the disodium salt of trimethylene diamine diaectic acid in aqueous solution for 10 hours at reflux. The reaction product, on acidification with HCl, yields a crystalline acid hydrochloride which is believed to have the following formula:

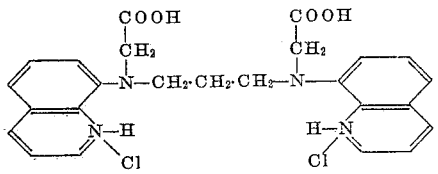

The acid form of the compound thus recovered is readily converted to the more easily utilizable water soluble alkali metal salt by dissolving it in an aqueous solution containing an appropriate molar amount of the corresponding alkali metal hydroxide or carbonate, ammonium hydroxide or amine to form the desired salt.

*Example V*

One mole of the intermediate substituted diamine obtained as the intermediate in Example III as the dihydrobromide is treated with two moles of caustic soda, evaporated under reduced pressure until practically all the water has been removed, and then refluxed with ten moles of acrylonitrile for 12 hours. The excess acrylonitrile was then distilled off and the residue, a viscous, brownish yellow syrup, was dissolved in two liters of four normal hydrochloric acid, and heated in this medium for six hours. It was then allowed to stand for an additional 24–36 hour period and distilled to a small volume under reduced pressure. A crystalline product was isolated which was believed to have the following formula:

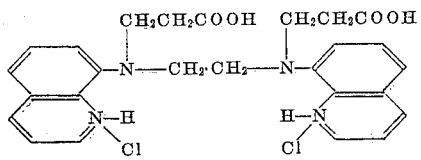

The acid form of the compound thus recovered is readily converted to the more easily utilizable alkali metal salt by dissolving it in an aqueous solution containing an appropriate molar amount of the corresponding alkali metal hydroxide, carbonate ammonium hydroxide or amine to form the desired salt.

The crude alkali metal salt may be recovered from the reaction medium in which the basic amine is carboxymethylated to form the acid compound. As stated, it is purely a matter of convenience in recovery that the reaction medium is acidified with mineral acid, hydrochloric or sulfuric, to precipitate the acid form of the compound. Where the alkali metal salt is to be recovered directly, somewhat careful control of the reaction conditions is desirable, in order that the several reactants be utilized in stoichiometric amounts thereby to give a crude salt containing only small contaminating amounts of reactants.

It is to be noted from the several examples that the acid form of the compound, its partial salt or completely neutral salt may be prepared. To form the fully neutral salt, sufficient alkali (whether alkali metal base or ammonium base) must be used to neutralize all of the acid functions of the compound. In Example III two acetic acid functions and two HCl functions are shown. Hence to form the neutral salt, the equal molar amount of base would be four moles per mole of compound. The mono acid salt would be formed by reaction with three moles of base. In Examples IV and V four moles of base would be needed to form the neutral salts. The preparation of the salts is carried out as a common acid—base titration and inflections in the acid—base titration curves identify the formation of the mono and di salts. Isolation of the salts calls merely for recrystallization.

This application is a continuation-in-part of my application Serial No. 183,078, filed September 2, 1950, now abandoned.

Having hereinabove described the present invention generically and specifically and given several specific examples thereof, it is believed apparent that the same may be widely varied without essential departure therefrom and all such modifications and departures of the same are contemplated as may fall within the scope of the following claims.

What is claimed is:

1. Compounds corresponding to the generic formula:

wherein A is selected from the group consisting of hydrogen, lower alkyl groups, and —CH$_2$COOH

—CH$_2$CH$_2$COOH and alkylene is a lower molecular weight alkylene group which places 2–3 carbon atoms directly between the indicated nitrogen atoms and $n$ is a positive integer having a value of at least 1 to about 4 and the alkali metal, and ammonium base salts thereof and the acid addition salts of the acid forms of said compounds.

2. Compounds in accordance with claim 1, in which alkylene is —CH$_2$.CH$_2$— and $n$ is 1.

3. Compounds in accordance with claim 1, in which alkylene is —CH$_2$.CH$_2$.CH$_2$— and $n$ is 1.

4. Compounds conforming to the formula:

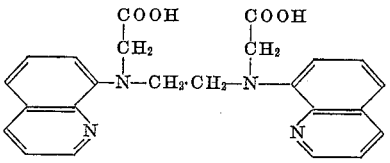

5. Compounds conforming to the formula:

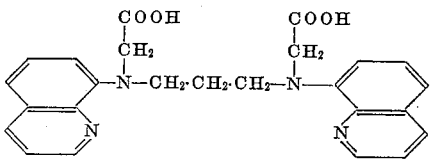

6. Compounds conforming to the formula:

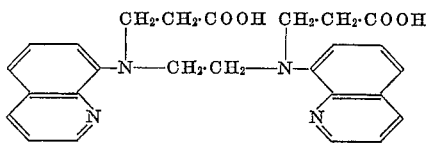

7. Compounds conforming to the formula:

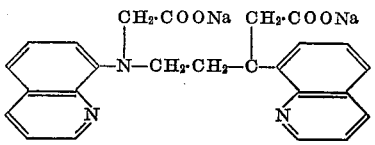

8. Compounds conforming to the formula:

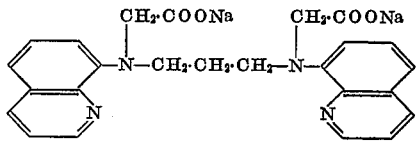

References Cited in the file of this patent
UNITED STATES PATENTS

| | | |
|---|---|---|
| 2,511,210 | Kendal et al. | June 13, 1950 |
| 2,520,902 | Bersworth | Sept. 5, 1950 |